Patented Nov. 13, 1934

1,980,258

UNITED STATES PATENT OFFICE 1,980,258

MOISTURE RESISTANT VARNISH

Myron E. Delaney, East Orange, N. J., assignor to Bakelite Corporation, New York, N. Y., a corporation of Delaware No Drawing. Application September 6, 1928, Serial No. 304,381

10 Claims. (Cl. 134—26)

This invention relates to varnishes or colloidal suspensions of resinous bodies in volatile liquids, characterized by water resistant properties and which for this purpose contain tung or China-wood oil on account of its so-called water-proofing effect.

Commercial varnishes containing tung oil, and generally denominated as spar varnishes, are not proof against water absorption. Tests made by comparing the weights of varnish-coated blocks of maple, about 3 inches by 6 inches by ½ inch thick, with uncoated blocks after confinement for about two weeks within a closed chamber where a 99 per cent humidity is maintained at a temperature of 70° F., show that blocks coated with spar varnishes are on the average only 70 per cent resistant, that is, they absorb about 30% as much moisture as the uncoated blocks. In another type of test, in which coated wooden blocks are immersed in water, blocks coated with spar varnishes increase approximately 3 per cent in weight in a period of 3 days and about 14 to 16 per cent in a period of 3 months.

According to the present invention oleo-resinous varnishes, that is varnishes containing a resinous body and tung oil or other fatty oil, have their water resistance increased to a marked degree by incorporating therewith a halogenated polycyclic hydrocarbon such as a chlorinated naphthalene, preferably one that is solid at normal room temperatures. Such substances are commercially available under the trade name of Halowax, and one found satisfactory for the purpose of this invention is a mixture containing principally tri- and tetra-chlor-naphthalene.

When chlorinated naphthalene is added to a prepared spar varnish, it is first necessary to remove the solvents from the varnish. The oleo-resinous content is then heated under a reflux condenser with about 15 to 24 per cent of chlorinated naphthalene until an intimate mixture is obtained whereupon the solvents are reintroduced to form the varnish. Such a treatment of a spar varnish has been found to reduce water absorption about 33 per cent.

However, in operations on a commercial scale chlorinated naphthalene is preferably added during the original varnish manufacture and before any solvents are included. The resinous body is refluxed with tung oil and chlorinated naphthalene and the usual solvents added thereafter to give a liquid composition of the desired consistency.

A specific example illustrative of this procedure consists in mixing about 3 parts by weight of ester gum with about 4 parts of tung oil and from 1 to 3 parts of chlorinated naphthalene; these are heated together for approximately 1 and ½ hours at about 260° C. Solvents are thereupon added, such as mixtures of equal parts of benzol, xylol and turpentine, in amount sufficient to yield a varnish containing somewhat over 50 per cent of solids; a small amount of drier, as cobalt paste, is likewise added.

A wide range of proportions of chlorinated naphthalene is indicated as there are no definite limits to the amount which can be added; the higher proportion indicated in the example gives a varnish which, when applied, deposits a film from which chlorinated naphthalene is precipitated as a wax-like deposit upon evaporation of solvents. The deposit that so settles out can be rubbed or polished, like a wax which is separately applied and rubbed.

Any of the usual natural or synthetic resins, compatible with or made compatible with tung oil or other suitable fatty oils for giving body to a varnish can be so treated with chlorinated naphthalene and their resistance to water thereby increased. A particularly desirable synthetic resinous material for the preparation of water resistant varnishes in accordance with this invention is one obtained by refluxing about 8 parts by weight of tung oil with about 5 parts each of formaldehyde and cresol, about 3 parts of rosin and about $\frac{1}{10}$ part of hexa methylene tetramine, and continuing the heating until a viscous dehydrated oleo-resinous body is obtained; the proportions of both the tung oil and the resin ingredients can be varied materially above and below those given. A varnish made therefrom by adding solvents, such as xylene or toluene, or their mixtures, to yield varnish with about 45 per cent solids, in itself has a high order of water resistance, the immersion test showing an absorption of only about 0.8 per cent in 3 days and about 8 per cent in three months. Upon digesting the above oleo-resinous or viscous product, obtained before the addition of solvents, with chlorinated naphthalene in an amount substantially 20 or 25 per cent of the mixture for about two hours at about 160 to 170° C., the water absorption of even such a water resistant varnish is reduced about one-half in a period of 3 days and more than two-thirds over the three months' period.

The addition of chlorinated naphthalene to a resinous substance is accomplished in the foregoing examples by heating their mixture under a reflux condenser until an intimate homogeneous body is obtained. It is not necessary, however, that the resinous body be first prepared; and it is even preferable, when possible, to include chlorinated naphthalene with the raw ingredients from which the resinous body is made. As illustrative of this method, about 100 parts by weight of tung oil, 120 parts each of cresol and formaldehyde, 50 parts of rosin, 1 part of hexamethylenetetramine and from 70 to 120 parts of chlorinated naphthalene are refluxed together and dehydrated. Thereupon the usual varnish solvents, such as a mixture of 90 parts of toluene and 250 parts of xylene, are incorporated following the customary practice.

Not only is the water absorption materially reduced by this treatment with chlorinated naphthalene, humidity tests showing the varnishes to be from 91 to 94 per cent resistant, but a longer life is imparted to a varnish film. For instance, where an untreated varnish film is destroyed in about two weeks by the immersion test, a similar varnish including chlorinated naphthalene gives a film that is intact at the end of a twelve weeks' immersion test. Furthermore, the drying time is much reduced particularly when the synthetic resinous materials are used as in the above examples; these dry to touch in about 4 hours while some spar varnishes require 20 hours.

The finish or film deposited by a varnish is also improved by the addition, as the high gloss is reduced toward a satin-like appearance as the amount of chlorinated naphthalene is increased. The deposited film can be rubbed to further improve the finish if desired.

Other materials or fillers can be included with the mixture, such as pigments, aluminum powder, leaf mica, etc.; for example, about 1½ pounds of aluminum powder can be added to each gallon of varnish. These are preferably added to the varnish and stirred in and are mainly effective in giving protection from ultra-violet rays.

The varnishes set forth and claimed in this application are particularly adapted for marine use, such as the outside of hulls. In this use chlorinated naphthalene serves a double function, for it has a decided protective effect against marine organisms which tend to gather on hulls and penetrate wood. They are also useful for interiors, as floor varnishes, etc.

I claim:

1. A process of preparing a water-resistant varnish which comprises reacting cresol, tung oil and formaldehyde together until a viscous resinous product is obtained, dehydrating the product, adding chlorinated naphthalene thereto, heating under a reflux condenser until an intimate mixture is obtained, and adding toluene and xylol thereto to form the varnish.

2. A process of preparing a water-resistant varnish which comprises reacting a phenol, a fatty oil and formaldehyde together until a viscous resinous product is obtained, dehydrating the product, adding chlorinated naphthalene thereto, heating under a reflux condenser until an intimate mixture is obtained, and adding solvent thereto to form the varnish.

3. In a process of preparing a water-resistant varnish, the step which comprises combining a resin with a fatty oil and with from 20 to 25 per cent of a normally solid chlorinated naphthalene at a temperature of about 160 to 170° C.

4. In a process of preparing a water-resistant varnish, the step which comprises combining a resin with a fatty oil and a chlorinated naphthalene in the absence of solvent.

5. Composition of water-resistant character comprising a resin combined with a fatty oil and modified by the addition of from 20 to 25 per cent of a normally solid chlorinated naphthalene.

6. Composition of water-resistant character comprising a resin combined with a fatty oil and modified by the addition of chlorinated naphthalene and aluminum powder.

7. In a process of preparing an oleo-resinous varnish composition of the air-drying type the step which comprises homogenizing a resin with a drying oil and with a chlorinated naphthalene in amount sufficient to impart increased water resistance.

8. Oleo-resinous composition of the air-drying type comprising a resin homogenized with a drying oil and modified by the addition of chlorinated naphthalene in amount sufficient to impart increased water resistance.

9. Oleo-resinous composition of the air-drying type comprising a resin homogenized with a drying oil and modified by the addition of a chlorinated naphthalene that is solid and wax-like at normal room temperature in amount sufficient to give increased water resistance.

10. Coating composition comprising an oleo-resinous varnish of the air-drying type including in solution a resin homogenized with a drying oil and modified by the addition of a chlorinated naphthalene that is solid and wax-like at normal room temperature in amount sufficient to impart increased water resistance.

MYRON E. DELANEY.